United States Patent [19]

Hill, Jr.

[11] Patent Number: 4,477,652

[45] Date of Patent: Oct. 16, 1984

[54] CONDENSATION POLYMERS OF CYCLIC DIOLS WITH ALDEHYDES OR ACETALS OF ALDEHYDES

[75] Inventor: H. Wayne Hill, Jr., Bartlesville, Okla.

[73] Assignee: Phillips Petroleum Company, Bartlesville, Okla.

[21] Appl. No.: 526,577

[22] Filed: Aug. 26, 1983

[51] Int. Cl.$^3$ .......................... C08G 4/00; C08G 8/10
[52] U.S. Cl. ..................... 528/232; 528/129; 528/137; 528/248; 528/249; 528/265
[58] Field of Search ............... 528/232, 248, 249, 265, 528/129, 137

[56] References Cited

U.S. PATENT DOCUMENTS

| | | | |
|---|---|---|---|
| 2,968,646 | 1/1961 | Caldwell et al. | 528/242 |
| 3,409,581 | 11/1968 | Hagan, Jr. | 523/424 |
| 3,442,864 | 5/1969 | Magee | 528/249 X |
| 3,457,228 | 7/1969 | Fischer et al. | 528/249 |
| 4,119,612 | 10/1978 | Volkommer et al. | 528/232 |

OTHER PUBLICATIONS

Hill et al., "Cyclic and Polymeric Formals", J. Am. Chem. S. 57, (1935), 925-928.
Jackson et al., "Process for Preparing High-Molecular-Weight Polyformals of Alicyclic Diols", Advances in Chemistry Series, No. 34 (1962), 200-207.

*Primary Examiner*—Lucille M. Phynes
*Attorney, Agent, or Firm*—Lyell H. Carver

[57] ABSTRACT

Condensation polymers prepared by reaction of a cyclic diol with a diether or aldehyde, or both, optionally with a branching agent, such as bis(4-hydroxycyclohexyl)-propane with paraformaldehyde, or a diether such as methylene-dimethyl ether, or both, optionally with a branching agent such as a pentaethritol, in the presence of an acidic catalyst such as p-toluenesulfonic acid.

24 Claims, No Drawings

CONDENSATION POLYMERS OF CYCLIC DIOLS WITH ALDEHYDES OR ACETALS OF ALDEHYDES

FIELD OF THE INVENTION

The invention pertains to the preparation of polyethers by condensation polymerization of a cyclic diol and an aldehyde or an acetal of an aldehyde. In a particular aspect, the invention pertains to polyformals prepared from a bis(4-hydroxycyclohexyl) compound and formaldehyde or its polymeric forms or its acetals. In a further aspect, the invention pertains to condensation polymers, optionally prepared to include optional branching agents.

BACKGROUND OF THE INVENTION

Polyformals and similar condensation polymers have been prepared by condensation polymerization from various alicyclic diols, and paraformaldehyde, employing catalysts such as sulfonic acid catalysts. However, improvements have been needed in obtaining higher molecular weight, higher melting, resins for use in fiber, film, and molding applications.

BRIEF SUMMARY OF THE INVENTION

I have discovered that using cyclic diols results in much improved condensation polymers.

In accordance with my invention, condensation polymers are prepared by reacting (A) a cyclic diol with (B) a reactant selected from ($B_1$) diethers and ($B_2$) aldehydes, or both, optionally with (C) a branching agent, employing (D) an acidic catalyst.

It is an object of my invention to provide high melting condensation polymers.

(A) Cyclic Diols

In accordance with my invention, I employ at least one (A) a cyclic diol reactant which can be represented by either formula ($A_1$):

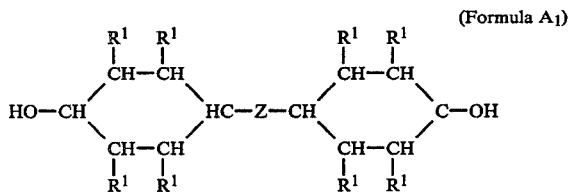
(Formula $A_1$)

in which each $R^1$ is independently selected from H and $CH_3$; Z can be a single covalent bond,

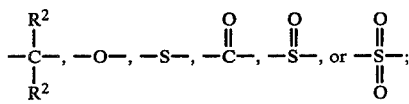

and each $R^2$ is independently selected from H, $CH_3$, and $C_2H_5$; or by:

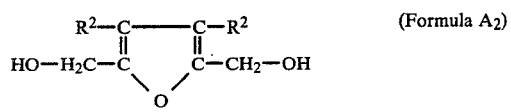
(Formula $A_2$)

in which each $R^2$ is as above defined.

Representative examples of ($A_1$) include:
bis(4-hydroxycyclohexyl),
bis(4-hydroxycyclohexyl)methane,
1,1-bis(4-hydroxycyclohexyl)ethylene,
1,1-bis(4-hydroxycyclohexyl)propane,
2,2-bis(4-hydroxycyclohexyl)propane,
2,2-bis(4-hydroxycyclohexyl)butane,
3,3-bis(4-hydroxycyclohexyl)pentane,
bis(4-hydroxycyclohexyl) ether,
bis(4-hydroxycyclohexyl) thioether,
bis(4hydroxycyclohexyl) ketone,
bis(4-hydroxycyclohexyl) sulfoxide,
bis(4-hydroxycyclohexyl) sulfone, and
mixtures thereof.

Representative examples of ($A_2$), presently less preferred than ($A_1$), include:
2,5-bis(hydroxymethyl)furan,
3-methyl-2,5-bis(hydroxymethyl)furan,
3,4-dimethyl-2,5bis(hydroxymethyl)furan,
3-methyl-4-ethyl-2,5-bis(hydroxymethyl)furan, and
mixtures thereof.

The presently preferred cyclic diol is 2,2-bis(4-hydroxycyclohexyl)propane, also called hydrogenated Bisphenol-A (HBPA).

(B) Diether or Aldehyde Reactant

In reaction with the (A) cyclic diols in accordance with my invention, can be employed either ($B_1$) diethers, ($B_2$) aldehydes, or both.

($B_1$) Diethers (Acetals)

The diethers (acetals) ($B_1$) can be represented by the formula:

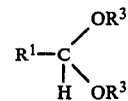

wherein each $R_3$ is individually selected from alkyl radicals of 1 to 5 carbon atoms, and $R^1$ is as above defined.

Exemplary species include: dimethoxymethane (also called methylene-dimethyl ether or dimethyl formal), γ- and δ-polyoxymethylene (polymeric forms of dimethoxymethane, described in Beilstein's Organische Chemie, Band I, Zweites Ergaenzungswerk, page 637); methoxyethoxymethane, diethoxymethane, di-n-propoxymethane diisopropoxymethane, di-n-butoxymethane, diisopentoxymethane, 1,1-dimethoxyethane, 1-methoxy-1-ethoxyethane, 1,1-diethoxyethane, 1-methoxy-1-propoxyethane, 1-ethoxy-1-isobutoxyethane, 1-ethoxy-1-isopentoxyethane, 1,1-diisopentoxyethane, and mixtures thereof. These diethers are presently less preferred than the ($B_2$) aldehydes.

($B_2$) Aldehydes

Alternatively and presently preferred are the use of at least one ($B_2$) aldehyde in reaction with at least one (A) cyclic diol. The aldehyde ($B_2$) reactants can be represented by the formula:

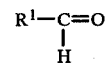

in which $R_1$ is as defined above.

Examplary species include: formaldehyde; polymeric forms of formaldehyde including cyclic trioxymethylene (metaformaldehyde), cyclic tetraoxymethylene, and linear α-, β-, or ε-polyoxymethylene (paraformaldehyde) described in Beilstein's Organische Chemie, Band I, Zweites Ergaenzungswerk, pages 635-638; acetaldehyde; polymeric forms of acetaldehyde including paraldehyde and metaldehyde described in Organic Chemistry, by Victor von Richter, P. Blakiston's Son and Co. (Phil., Pa., 1929), Vol. I, page 200. Mixtures can be employed. The presently most preferred aldehyde ($B_2$) is the solid paraformaldehyde for convenience and availability.

(C) Optional Branching Agents

An optional, though presently not preferred component, is at least one (C) branching agent to provide a branched polymer. The (C) branching agents which can be selected from the group consisting of at least one of ($C_1$) orthoesters and ($C_2$) polyhydric alcohols.

($C_1$) Orthoesters

Orthoesters ($C_1$) employable can be represented by the formula:

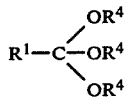

in which $R^1$ is as above defined H or $CH_3$, and each $R^4$ is independently selected from $CH_3$ and $C_2H_5$. Examples include trimethyl orthoformate, triethyl orthoformate, triethyl orthoacetate, and mixtures.

($C_2$) Polyols (Polyhydric Alcohols)

Polyols ($C_2$) can be selected from aliphatic tri- and tetrahydric alcohols, such as 1,2,3-propanetriol (glycerol), 1,2,3,4-butanetetrol, pentaerythritol, and mixtures.

(D) Acidic Catalysts

Acidic catalysts (D) include aromatic, aliphatic, and cycloaliphatic sulfonic acids such as benzene sulfonic acid, o-toluene sulfonic acid, p-toluene sulfonic acid, methane sulfonic acid, and 10-camphor sulfonic acid. Presently preferred is p-toluene sulfonic acid. Other useful, though presently less preferred, acid catalysts, include, for example, Lewis acids such as $AlCl_3$, $SnCl_4$, and $FeCl_3$.

Reaction Conditions

Reaction Ratios of A:B, Optionally With C

The mole ratio of (A) cyclic diol to (B) can range fairly widely from such as about 0.8:1 to 1.2:1, preferably 0.9:1 to 1.1:1, more preferably about 0.95:1 to 1.05:1.

The mole ratio of (A) to (C) branching agent, when employed, generally ranges from about 20:1 to 100:1.

The mole ratios of ($A_1$):($A_2$), ($B_1$)-($B_2$), and ($C_1$):($C_2$) in mixtures, when employed, can range widely from about 1:99 to 99:1.

Amounts of Catalysts

The mole ratio of (D) acid catalyst to (A) cyclic diol can be such as in the range of about 0.2:100 to 2:100, preferably about 0.5:100 to 1.5:100.

Temperature

The reaction temperatures generally range from about 60° C. to 250° C., more preferably from about 70° C. to 200° C.

Pressures

The pressures employed can range from atmospheric pressure to an elevated, autogenous pressure of solvents and reactants of the temperature specified above.

Time

The reaction time depends on the temperature employed, but generally ranges from about 1 to 10 hours.

Solvent

Any nonreactive liquid organic solvent can be employed, such as aromatic hydrocarbons and aromatic ketones. Presently preferred are toluene and a mixture of toluene and benzophenone. Suggested is a weight ratio of solvent to cyclic diol (A) from about 4:1 to 6:1.

Reaction

The reaction can be carried out in any suitable stirred reactor vessel preferably equipped with a cooled, such as water-cooled, reflux condenser. The reactor vessel can be of a suitable construction such as a glass flask or a stainless steel vessel. Reflux conditions are selected such that water vapors can escape during the polycondensation, but reagents are retained by refluxing.

Recovery

The polyether condensation polymers can be recovered from the reaction mixture by partial or essentially complete evaporation of the solvent, or by addition of an aqueous solution such as an aqueous $NaHCO_3$ solution, or by addition of an organic liquid that is not a solvent for the polymer, such as methanol, and subsequent filtration or centrifugation. Further purification of the polymer can be achieved by extracting it with an organic liquid that is not a solvent for the polymer, e.g., methanol, or by dissolving it in a solvent, e.g., p-cresol, and reprecipitating it.

The presently preferred recovery method for the preferred polyformals, i.e., polyethers of cyclic diols and formaldehyde or its polymeric form - paraformaldehyde—comprises the addition of an aqueous solution of $NaHCO_3$, filtration, extraction with methanol, and drying.

EXAMPLES

Examples are provided in order to assist in an understanding of the invention. Exemplary species, reactants, ratios, are intended to be exemplary and not limitative of the reasonable scope of the invention.

EXAMPLE I

In this example the preparation of polyformals from hydrogenated Bisphenol-A (HBPA) is described. 100 grams (0.42 mole) of HBPA (Rhone Poulenc Chimie Fine, Paris, France; recrystallized from chloroform), were added to a 1-liter glass flask fitted with a mechanical stirrer, a heating mantle, and a Dean-Stark trap. The recrystallized, dried HBPA had an isomer distribution of 91.6 percent trans, trans, 7.85 percent cis, trans, and 0.55 percent cis, cis. Then 13.01 grams (0.42 mole) of 96% pure paraformaldehyde (Eastman-Kodak, Lot #E9A), 0.50 grams (0.003 mole) of p-toluenesulfonic acid (Eastman-Kodak, Lot #H3A), and 500 milliliters of toluene (Fisher Scientific Co.; density: 0.867 g/cc; distilled from calcium hydride) were added to the reactor.

This suspension was heated to about 76° C. and maintained at that temperature until it became homogeneous, which required about 1 hour of heating and stirring. Then the reaction mixture was heated to about 100° C. for about 1 hour. Subsequently it was refluxed for 2 hours, with water formed during the polycondensation reaction allowed to escape as vapor.

The reaction mixture was cooled while being stirred. 200 milliliters of a saturated aqueous sodium bicarbonate solution were added under stirring, and stirring was continued for about 15 more minutes. The HBPA-based polyformal resin was filtered out and purified by Soxhlet extraction with methanol for 6 hours. The white polymer was dried and characterized.

The inherent viscosity (I.V.), of the so-prepared polyformal was determined using a stirred water bath maintained at 30° C. using a Lauda model B-1 temperature controller and a #2 viscometer. 0.5 grams of the dried polyformal were dissolved in 100 milliliters of p-cresol. Flow times of the solution and of the pure solvent were measured. The inherent viscosity (I.V.), defined as $$\frac{\ln(\text{solution time: solvent time})}{\text{polymer concentration (g/100 ml)}},$$

of the polyformal was 0.19.

Differential thermal analyses (DTA) were carried with a DuPont 900 differential thermal analyzer. The polyformal was melted and then quenched with liquid nitrogen. The cooled polymer was heated again at a rate of 10° C. per minute. The glass transition temperature (Tg) was 80° C., the crystallization temperature (Tc) was 135° C., and the melting temperature (Tm) was 222° C.

EXAMPLE II

A second polymer sample prepared under substantially the same conditions as described in Example I had the following characteristics:
I.V.=0.23; Tg=82° C.;
Tc=137° C.; Tm=240° C.
The polymer yield of the polycondensation was 78%.

EXAMPLE III

Another polyformal sample prepared at a yield of 75.7% (based on paraformaldehyde) in accordance with the procedure of Example I, except that only 12.75 grams (0.41 mole) of paraformaldehyde were used, had an I.V. of 0.24. Fibers could be drawn from the melt, demonstrating its utility for fiber and other extrusion applications.

EXAMPLE IV

In this run, a mixture of toluene and benzophenone was used as the solvent for the polycondensation mixture of HBPA and paraformaldehyde. 5.00 grams (0.021 mole) HBPA (recrystallized from chloroform), 0.65 gram (0.021 mole) of paraformaldehyde, about 0.05 gram (0.0003 mole) of p-toluenesulfonic acid, 20 milliliters of toluene, and 20 milliliters of benzophenone (density: 1.146 g/cc) were charged to the 1-liter flask as described in Example I. The mixture was stirred and heated to about 76° C. for about 1 hour. Thereafter the temperature was raised to about 110° C. After about 1 hour at 110°, the mixture was refluxed at approximately 184° C. for about 50 minutes. After cooling, 50 milliliters of saturated aqueous sodium bicarbonate solution were added under stirring. The liquid phase was decanted, and the solid polymer was kept under methanol overnight. Subsequently the polymer was purified by Soxhlet extraction with methanol and dried in a vacuum oven.

The inherent viscosity of the prepared polyformal was 0.20.

EXAMPLE V

In this run, a multifunctional comonomer, pentaerythritol, was included. The polycondensation was carried out essentially in accordance with the procedure outlined in Example I with 99.1 grams (0.42 mole) of recrystallized HBPA, 13.01 grams (0.42 mole) of paraformaldehyde, 1.00 gram (0.007 mole) of pentaerythritol, (Eastman-Kodak, Lot B8B), 0.41 gram (0.0024 mole) of p-toluene sulfonic acid, and 500 milliliters of toluene.

The thus prepared polyformal resin had an inherent viscosity of 0.23, a Tg of 85° C., a Tc of 143° C., and a Tm of 239° C. Apparently the incorporation of pentaerythritol as a comonomer in HBPA-based polyformal did not noticeably affect the I.V. or thermal characteristics.

The disclosure, including data, has illustrated the value and effectiveness of my invention. The Examples, the knowledge and background of the field of the invention and the general principles of chemistry and of other applicable sciences have formed the bases from which the broad descriptions of my invention including the ranges of conditions and the generic groups of operant components have been developed, and formed the bases for my claims here appended.

I claim:

1. A process of preparing a condensation polymer by reacting effective ratios of:
   (A) at least one cyclic diol, with at least one reactant selected from the group consisting of ($B_1$) diethers and ($B_2$) aldehydes, employing (D) an acidic catalyst under effective reaction conditions;
   wherein said (A) cyclic diol is selected from the group consisting of:

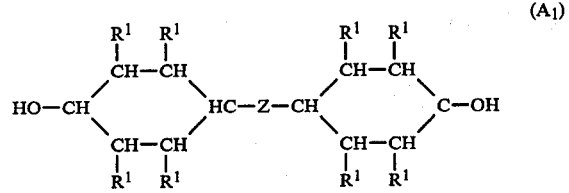

wherein each $R^1$ is independently selected from H and $CH_3$; Z is a single covalent bond,

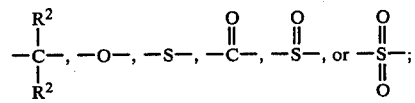

and each $R^2$ is independently selected from H, $CH_3$, and $C_2H_5$; and

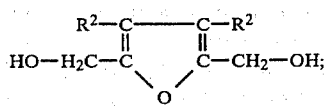

wherein said (B₁) diether reactant is represented by the formula:

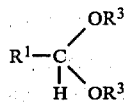

wherein each $R^3$ is individually selected from alkyl radicals of 1 to 5 carbon atoms, and said aldehyde (B₂) reactant is selected from the group consisting of formaldehyde; polymeric forms of formaldehyde including cyclic trioxymethylene, cyclic tetraoxymethylene, and linear α-, β-, or ε-polyoxymethylene; acetaldehyde; and polymeric forms of acetaldehyde including paraldehyde and metaldehyde.

2. The process of claim 1 wherein said (A) cyclic diol is said (A₁) and is selected from the group consisting of:
bis(4-hydroxycyclohexyl),
bis(4-hydroxycyclohexyl)methane, 1,1-bis(4-hydroxycyclohexyl)ethylene,
1,1-bis(4-hydroxycyclohexyl)propane,
2,2-bis(4-hydroxycyclohexyl)propane,
2,2-bis(4- hydroxycyclohexyl)butane,
3,3-bis(4-hydroxycyclohexyl)pentane,
bis(4-hydroxycyclohexyl) ether,
bis(4-hydroxycyclohexyl) thioether,
bis(4-hydroxycyclohexyl) ketone,
bis(4-hydroxycyclohexyl) sulfoxide, bis(4-hydroxycyclohexyl) sulfone, and mixtures thereof.

3. The process of claim 1 wherein said (A) cyclic diol is said (A₂) and is selected from the group consisting of:
2,5-bis(hydroxymethyl)furan,
3-methyl-2,5-bis(hydroxymethyl)furan
3,4-dimethyl-2,5-bis(hydroxymethyl)furan,
3-methyl-4-ethyl-2,5-bis(hydroxymethyl)furan, and mixtures thereof.

4. The process of claim 1 employing as said (B) reactant said (B₁) diether reactant.

5. The process of claim 4 wherein said (B₁) diether reactant is selected from the group consisting of: dimethoxymethane, γ- and δ-polyoxymethylene, methoxyethoxymethane, diethoxymethane, di-n-propoxymethane, diisopropoxymethane, di-n-butoxymethane, diisopentoxymethane, 1,1-dimethoxyethane, 1-methoxy-1-ethoxyethane, 1,1-diethoxyethane, 1-methoxy-1-propoxyethane, 1-ethoxy-1-isobutoxyethane, 1-ethoxy-1-isopentoxyethane, 1,1-diisopentoxyethane, and mixtures thereof.

6. The process of claim 1 employing as said (B) reactant said (B₂) aldehyde reactant.

7. The process of claim 1 employing as said (A) cyclic diol 2,2-bis(4-hydroxycyclohexyl propane); and a said (B₂) aldehyde as said (B) reactant wherein said (B₂) aldehyde is paraformaldehyde.

8. The process of claim 1 further employing at least one (C) branching agent selected from the group consisting of at least one of (C₁) orthoesters, (C₂) polyhydric alcohols, and mixtures.

9. The process of claim 8 employing a said (C₁) orthoester as said branching agent wherein said (C₁) orthoesters are represented by the formula:

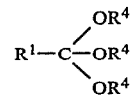

wherein each $R^4$ is independently selected from $CH_3$ and $C_2H_5$; and said (C₂) polyhydric alcohols are selected from aliphatic tri- and tetrahydric alcohols.

10. The process of claim 9 wherein said (C) branching agent is selected from the group consisting of trimethyl orthoformate, triethyl orthoformate, triethyl orthoacetate, 1,2,3-propanetriol, 1,2,3,4-butanetetrol, pentaerythritol, and mixtures.

11. The process of claim 1 wherein said (D) acidic catalyst is selected from the group consisting of benzene sulfonic acid, o-toluene sulfonic acid, p-toluene sulfonic acid, methane sulfonic acid, 10-camphor sulfonic acid, $AlCl_3$, $SnCl_4$, and $FeCl_3$.

12. The process of claim 9 employing a mole ratio of cyclic diol (A) to reactant (B) of about 0.9:1 to 1.1:1, a mole ratio of (D) acidic catalyst to (A) cyclic diol of about 0.2:100; a reaction temperature of about 60° C. to 250° C.; a pressure from atmospheric pressure to autogenous pressure of solvents and reactants of the reaction temperature employed; a reaction time of about 1 to 10 hours; and conducting said reaction in a liquid organic solvent selected from aromatic hydrocarbons, aromatic ketones, and mixtures.

13. The process of claim 12 employing Bisphenol A, paraformaldehyde, and p-toluenesulfonic acid.

14. A condensation polymer prepared by reacting effective ratios of:
(A) at least one cyclic diol, with at least one reactant selected from the group consisting of (B₁) diethers and (B₂) aldehydes, employing (D) an acidic catalyst under effective reaction conditions;
wherein said (A) cyclic diol is selected from the group consisting of:

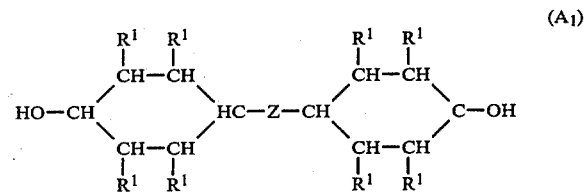

wherein each $R^1$ is independently selected from H and $CH_3$; Z is a single covalent bond,

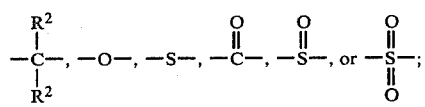

and each $R^2$ is independently selected from H, $CH_3$, and $C_2H_5$; and

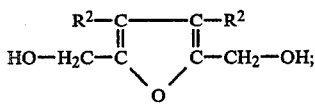

wherein said (B₁) diether reactant is represented by the formula:

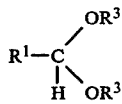

wherein each $R^3$ is individually selected from alkyl radicals of 1 to 5 carbon atoms, and said aldehyde (B₂) reactant is selected from the group consisting of formaldehyde; polymeric forms of formaldehyde including cyclic trioxymethylene, cyclic tetraoxymethylene, and linear α-, β-, or ε-polyoxymethylene; acetaldehyde; and polymeric forms of acetaldehyde including paraldehyde and metaldehyde.

15. The polymer of claim 14 wherein said (A) cyclic diol is said (A₁) and is selected from the group consisting of:
bis(4-hydroxycyclohexyl),
bis(4-hydroxycyclohexyl)methane,
1,1-bis(4-hydroxycyclohexyl)ethylene,
1,1-bis(4-hydroxycyclohexyl)propane,
2,2-bis(4-hydroxycyclohexyl)propane,
2,2-bis(4-hydroxcyclohexyl)butane,
3,3-bis(4-hydroxycyclohexyl)pentane,
bis(4-hydroxycyclohexyl) ether,
bis(4-hydroxycyclohexyl) thioether,
bis(4-hydroxycyclohexyl) ketone,
bis(4-hydroxycyclohexyl) sulfoxide,
bis(4-hydroxcyclohexyl) sulfone, and mixtures thereof.

16. The polymer of claim 14 wherein said (A) cyclic diol is said (A₂) and is selected from the group consisting of:
2,5-bis(hydroxymethyl)furan,
3-methyl-2,5-bis(hydroxymethyl)furan
3,4-dimethyl-2,5-bis(hydroxymethyl)furan
3-methyl-4-ethyl-2,5-bis(hydroxymethyl)furan, and mixtures thereof.

17. The polymer of claim 14 employing as said (B) reactant said (B₁) diether reactant.

18. The polymer of claim 17 wherein said (B₁) diether reactant is selected from the group consisting of dimethoxymethane, γ- and δ-polyoxymethylene, methoxyethoxymethane, diethoxymethane, di-n-propoxymethane, diisopropoxymethane, di-n-butoxymethane, diisopentoxymethane, 1,1-dimethoxyethane, 1-methoxy-1-ethoxyethane, 1,1-diethoxyethane, 1-methoxy-1-propoxyethane, 1-ethoxy-1-isobutoxyethane, 1-ethoxy-1-isopentoxyethane, 1,1-diisopentoxyethane, and mixtures thereof.

19. The polymer of claim 14 employing as said (B) reactant said (B₂) aldehyde reactant.

20. The polymer of claim 15 employing as said (A) cyclic diol 2,2-bis(4-hydroxycyclohexyl propane); and a said (B₂) aldehyde as said (B) reactant wherein said (B₂) aldehyde is paraformaldehyde.

21. The polymer of claim 14 further employing at least one (C) branching agent selected from the group consisting of at least one of (C₁) orthoesters, (C₂) polyhydric alcohols, and mixtures.

22. The polymer of claim 21 employing a said (C₁) orthoester as said branching agent wherein said (C₁) orthoesters are represented by the formula:

wherein each $R^4$ is independently selected from $CH_3$ and $C_2H_5$; and said (C₂) polyhydric alcohols are selected from aliphatic tri-and tetrahydric alcohols.

23. The polymer of claim 22 wherein said (C) branching agent is selected from the group consisting of trimethyl orthoformate, triethyl orthoformate, triethyl orthoacetate, 1,2,3-propanetriol, 1,2,3,4-butanetetrol, pentaerythritol, and mixtures.

24. The polymer of claim 23 employing Bisphenol A, and paraformaldehyde.

* * * * *

UNITED STATES PATENT AND TRADEMARK OFFICE
CERTIFICATE OF CORRECTION

PATENT NO. : 4,477,652

DATED : October 16, 1984

INVENTOR(S) : H. Wayne Hill

It is certified that error appears in the above—identified patent and that said Letters Patent are hereby corrected as shown below:

Column 8, line 29, claim 12, line 4, after "0.2:100"

should be --- to 2:100 ---.

Signed and Sealed this

Ninth Day of July 1985

[SEAL]

Attest:

DONALD J. QUIGG

Attesting Officer     Acting Commissioner of Patents and Trademarks